United States Patent [19]

Marx et al.

[11] 3,980,601

[45] Sept. 14, 1976

[54] THERMOSTABLE COATING, IMPREGNATING AND BONDING AGENTS

[75] Inventors: Matthias Marx, Bad Duerkheim; Jenoe Kovacs, Bobenheim-Roxheim; Gerhard Storck, Ruchheim, all of Germany

[73] Assignee: Badische Anilin- & Soda-Fabrik Aktiengesellschaft, Ludwigshafen (Rhine), Germany

[22] Filed: Mar. 10, 1975

[21] Appl. No.: 557,047

Related U.S. Application Data

[63] Continuation of Ser. No. 337,471, March 2, 1973, abandoned.

[30] Foreign Application Priority Data
March 4, 1972 Germany .......................... 2210484

[52] U.S. Cl.................. 260/29.6 NR; 260/17 R; 260/29.3; 260/29.4 UA; 260/29.6 HN; 428/375; 428/458

[51] Int. Cl.²......................................... C08L 79/08

[58] Field of Search ............... 260/29.2 N, 29.6 NR, 260/29.2 E, 75 N, 29.6 HN

[56] References Cited
UNITED STATES PATENTS

| | | | |
|---|---|---|---|
| 2,335,930 | 12/1943 | Freeland et al................. | 260/29.2 N |
| 2,405,965 | 8/1946 | Leekley .......................... | 260/29.2 N |
| 3,355,409 | 11/1967 | Bissot............................. | 260/29.2 N |
| 3,582,507 | 6/1971 | Peerman........................ | 260/29.2 N |
| 3,620,996 | 11/1971 | Matsumura et al............. | 260/75 N |
| 3,652,471 | 3/1972 | Sattler............................. | 117/128.4 |
| 3,652,511 | 3/1972 | Vincent.......................... | 260/29.2 N |
| 3,663,728 | 5/1972 | Hoback et al. ................ | 260/29.2 N |
| 3,695,929 | 10/1972 | Sattler............................. | 117/128.4 |
| 3,726,712 | 4/1973 | Rieck et al...................... | 117/128.4 |
| 3,738,967 | 6/1973 | Crivello ......................... | 260/29.2 N |

FOREIGN PATENTS OR APPLICATIONS

| | | |
|---|---|---|
| 891,538 | 3/1962 | United Kingdom |
| 1,019,632 | 2/1966 | United Kingdom |

OTHER PUBLICATIONS

Solomon, *The Chemistry of Water Organic Film Formers,* Wiley & Sons (1967) pp. 287–299.

*Primary Examiner*—Murray Tillman
*Assistant Examiner*—W. C. Danison, Jr.
*Attorney, Agent, or Firm*—Johnston, Keil, Thompson & Shurtleff

[57] ABSTRACT

The present invention relates to thermostable coating, impregnating and bonding agents. They are suspensions of finely divided water-insoluble or at most only slightly water-swellable thermostable organic binders or mixtures based on these binders in aqueous solutions of high molecular weight organic substances. They are used particularly for coating wire, for the production of thermostable coatings and for the production of laminates.

4 Claims, No Drawings

THERMOSTABLE COATING, IMPREGNATING AND BONDING AGENTS

This is a continuation of application Ser. No. 337,471, filed Mar. 2, 1973, now abandoned.

The present invention relates to thermostable coating, impregnating and bonding agents which contain water-insoluble binders or binders which at the most swell slightly in water in finely divided form dispersed in an aqueous solution containing a water-soluble thickener.

Thermostable organic binders within the meaning of the present application are those which have a limiting temperature (= long-term service temperature according to DIN 53,446) of more than 100°C, preferably more than 150°C. Limiting temperature is defined as the temperature at which the substance in question can be kept for 25,000 hours without any appreciable change in its properties.

Examples of organic high molecular weight substances which satisfy this condition are aromatic polyesters and polyamides, polyamide imides, polyester imides, polyimides and polybenzoimidazoles. Wide use of such products is prevented however in many cases by difficulties in processing because they are either insoluble or are only soluble in solvents which are not favorable for processing. For example the following solvents are used: phenols, cresols, xylenols, N-methylpyrrolidone and the like and mixtures which contain such solvents.

Because of the poor volatility of these solvents there is a risk that they will accumulate in the exhaust air ducts of the baking plant where some will coke and will have to be cleaned out from time to time because of the risk of fire.

The use of solvents moreover constitutes a serious pollution risk because of their unpleasant odor and toxicity.

Since the polymer solutions are as a rule of low concentration, namely from about 20 to 30%, the amount of injurious offgas is particularly high in the case of solutions of thermostable polymers. Moreover the low solids content is the cause of the said products being fairly unreliable in processing, the result being sag formation, inferior edge covering and inadequate layer thickness. Some thermostable polymers are only soluble in the form of certain preliminary stages. For example polyimides are not as a rule soluble and are therefore dissolved in the form of the polyamide acid precursor. This precursor has only limited stability in storage.

There has therefore been a changeover to processing such polymers as film or sheeting. Apart from the fact that this necessitates an additional processing stage, this method of application cannot be used for objects of all shapes.

It is known that acqueous polymer dispersions can be prepared by emulsion polymerization from monomeric polymerizable compounds (which have been dispersed by means of surfactants (emulsifiers) in water) in the presence of polymerization initiators yielding free radicals. The advantages of emulsion polymerization cannot in general be transferred to the production of special thermostable polycondensates or polyadducts because in this case the presence of water usually has an unfavorable effect on the course of the polycondensation or polyaddition.

Recently, more interest has been shown in powdered systems. They require a very high technological expenditure however for their application; application in a plurality of layers, such as is necessary for example in the case of insulating coating compositions to ensure a flawless coating, is not possible in this case.

It is an object of the present invention to provide thermostable coating, impregnating and bonding agents which have processing advantages over the abovementioned prior art methods without the additional expenditure for apparatus generally necessary for powder coating and while avoiding the abovementioned disadvantages and which enable high-grade thermostable coatings, impregnations and bonds to be obtained.

In accordance with the present invention a thermostable coating, impregnating or binding agent contains:
A. water;
B. at least one thermostable organic binder or mixture based on such a binder which is insoluble in water or at the most slightly swellable in water; and
C. at least one suspension agent dissolved in water with or without one or more water-dilutable ionic or nonionic organic dispersing agents, the component (B) having a long-term service temperature of more than 100°C and being present in the form of particles having a diameter of from 0.1 to 150, preferably from 0.5 to 90, microns, these particles if desired containing other additives such as pigments, fillers, dyes, crosslinking catalysts, accelerators, flow improvers and/or solvents, and the component (C) consisting of one or more high molecular weight organic substances. The component (C) is preferably a thickening agent and may contain additionally one or more water-dilutable ionic or nonionic organic dispersing agents and has a viscosity of from 0.5 to 50 centipoises in a 0.015% aqueous solution at 20°C.

In a particularly preferred embodiment of the present invention the component (C) of the coating, impregnating or bonding agent is the salt of a polyacrylic acid.

The dispersions or suspensions according to the invention do not have the said disadvantages of organic solutions of coating compositions; they dispense with the additional expenditure for apparatus generally necessary for powdered systems and are suitable for application with conventional coating equipment by conventional methods such as spraying, dipping, pouring, flooding, impregnating, brushing or knife-coating. High-grade thermostable coatings, impregnations and bonds are obtained with the dispersions and suspensions according to the invention.

The suspensions according to the invention may be processed like conventional binder solutions. It is surprising and could not have been foreseen that the same properties of coatings, impregnations and bonds obtained with conventional binder solutions can be obtained with the aqueous suspensions according to the invention.

It is a technical advantage that the suspensions can be processed in a more highly concentrated form than the solutions. Thus for example a wire-coating suspension according to the present invention may be applied in a concentration of 40% from a liquor by means of coating dies, whereas the same coating composition can be processed in a concentration of only 25% from solution in the same machine at the same speed. Whereas an adequate thickness of coating can only be achieved with the coating solution after five passes, a comparable coating — equally faultless — is achieved with the coating suspension according to the invention after only two passes. Odor nuisance in the coating zone, such as is characteristic of solution-type wire coating compositions, is not detectable in processing the suspension.

There are similar advantages in the production of composite materials, for example materials reinforced by glass fibers. Impregnation of the reinforcement material is not dangerous because there is no fire risk. Special ventilating equipment and plant for solvent recovery are not necessary because water is the only volatile component occurring in appreciable amounts. The coating, impregnating and bonding agents according to the invention thus exhibit considerable economic advantages over prior art methods.

The following details are given concerning the components which make up the thermostable coating, impregnating and bonding agents according to the invention:

A. the dispersions or suspensions according to the invention contain water as the continuous phase in which the component (C) is dissolved. The coating, impregnating and bonding agents according to the invention contain from 45 to 80%, preferably from 55 to 75%, by weight of water. The water may if desired contain a minor amount, i.e. from 0.5 to about 5% of the weight of water, of an organic solvent such as a lower alcohol as for example methanol, ethanol, propanol, methyl glycol, ethtyl glycol, glycol, glycerol, ketones such as acetone and methyl ethyl ketone, or a high-boiling solvent having complete or limited miscibility with water such as phenols, for example phenol proper or cresol, acetamide, dimethylformamide, or N-methylpyrrolidone.

B. The components (B) are insoluble in water or at the most slightly swellable in water and are organic binders or mixtures based on such binders.

Mixtures in the present context include: combinations (physical mixtures or chemically combined mixtures) of binders, systems of binders and hardeners and/or accelerators, binders and fillers, as for example dolomite or silicates, pigments as for example inorganic oxides such as $TiO_2$, loading materials, as for example heavy spar, reinforcement materials, as for example metal whiskers, glass fibers, graphite fibers, boron fibers, and also combinations of binders, or mixtures based on such binders, with auxiliaries and modifying agents such as flow improvers, as for example diphenyl, lauric acid, plasticizers and/or dispersing agents.

If additives and auxiliaries are used with the binders in the said mixtures they are generally contained in the components (B) in an amount of from 25 to 90%, preferably from 30 to 70%, by weight.

When the suspensions according to the invention are to be used as electrical insulating materials the components (B) are used as a rule devoid of pigment and filler.

Suitable binders (B) are those which melt and flow without decomposition. Binders which per se cannot be melted but can be caused to flow by adding a flow improver or another resin, as a rule of similar constitution, are also suitable. Organic or organometallic components which soften below 400°C are preferred.

Binders which are suitable according to the invention for the production of thermostable coatings, impregnations and bonds include polycondensates and/or polyadducts such as linear and branched polyesters, as for example described in E. Behr, Hochtemperaturbeständige Polymere, Hanser-Verlage (1969), for example polyesters based on polycondensation products of polybasic aromatic polycarboxylic acids or mixtures of the same with aliphatic polycarboxylic acids, preferably corresponding dicarboxylic acids, as for example terephthalic acid, isophthalic acid and adipic acid with polyhydric, particularly dihydric and trihydric alcohols, as for example ethylene glycol, hexanediol, neopentyl glycol, trimethylolpropane and tris-(hydroxyethyl)-isocyanurate, and also for example polyamides, polyimides, polymers having a high content of aromatic hydrocarbon or heterocyclic bonds, polycarbonates, particularly those based on bisphenol A, polyamideimides, pure and modified silicone resins, crosslinked and uncrosslinked polyurethanes, certain epoxy resins, coordination complex polymers or their precursors still capable of being melted, polyesterimides, polyesteramides, polybismaleimides, for example those based on 4,4'-diaminodiphenyl ether/maleic anhydride, polyphenylene oxide, polysulfones, phenol-formaldehyde resins, amine-formaldehyde resins, for example based on hexamethoxymethylmelamine, and if desired mixtures of these substances. Polyesters, polyesterimides, polyesteramides and polybismaleimides are particularly suitable as components (B).

Suitable thermostable binders also include those of the type of linear polymers, of the type of semiconductor and of the type of conductive polymers.

The component (B) is dispersed or suspended in finely divided form in the suspensions according to the invention in an amount of from 20 to 55%, preferably from 25 to 40%, by weight in the continuous aqueous phase (A) and (C). The particle diameter of the component (B) is from 0.1 to 150, preferably from 0.5 to 90, microns. For coating purposes the bulk of the suspended particles advantageously has a diameter of from 0.5 to 50 microns, and for use as wire coating composition by multilayer application advantageously less than 10 microns.

The shape of the particles, whether globular or anisometric, with smooth or rough surface, is as a rule without any great effect on the use and properties of the coatings, impregnations or bonds prepared therewith.

C. The high molecular weight organic substances dissolved in the aqueous continuous phase and serving as suspension agents are thickening agents, mixtures of thickening agents with one another or mixtures of thickening agents with ionic or nonionic organic dispersing agents. Particularly suitable thickening agents are those organic substances of high molecular weight which have a viscosity of from 0.5 to 50 centipoises in 0.15% aqueous solution at 20°C. Examples of such thickening agents are high molecular weight watersoluble polymeric products such as high molecular weight natural substances, which may have been modified chemically, as for example gelatins, carboxymethylcelluloses, methylcelluloses, high molecular weight synthetic products, as for example polyvinylpyrrolidone, polyacrylamide, polymethacrylamide, polyvinyl alcohol, polymers or copolymers of ammonium acrylate, ammonium methacrylate or dimethylaminoethyl ammonium hydrochloride. Mixtures of the said products are also suitable. The thickening agents may be either linear, branched or slightly crosslinked. Salts of high molecular weight polyacrylic acids, particularly their ammonium salts whose 0.015% solution in water has a viscosity of from 0.5 to 50 centipoises are particularly suitable.

Component (C) serves to adjust the viscosity to increase storage stability of the suspension and to promote adhesion of the suspension to the substrate to be coated.

The component (C) is contained in the coating, impregnating or bonding agent according to the invention in an amount of from 0.01 to 5%, preferably from 0.01 to 1.5%, by weight based on (B).

To prevent agglomeration of the dispersed particles of solid and to stabilize the viscosity and processability of the suspension it may be advantageous in some cases to add a water-dilutable ionic or nonioniic organic dispersing agent, i.e. one which is truly or colloidally soluble in the aqueous phase. These dispersing agents are as a rule polymeric electrolytes having anionic or cationic groups. They are generally effective in only very small amounts and may be used in amounts of from about 0.01 to 0.5% up to a maximum of about 5% based on the dispersed substance. Examples of suitable dispersing agents and suspension agents are binders such as are used for the production of water-soluble coating agents. Such binders are described for example in D. H. Solomon, "The Chemistry of Water Organic Film Formers", Wiley & Sons (1967), pages 287 to 299.

The thickening and dispersing agents of components (C) may contain functional groups which permit a chemical reaction with the suspended substance in the hardening or sintering process. The compatibility of the components is thus increased and, in consequence, for example the clarity, gloss and surface hardness of the hardened end product are improved. This may be of importance especially in the production of coatings and particularly in the production of coatings on wire.

The suspensions may be produced by various methods, for example by stirring the powdered component (B) into an aqueous solution of the thickening agent (C) which may contain a dispersing agent. The fact that mixtures of powdered products may also be used is of particular interest. Another method of production is atomization of an organic solution of component (B) into an aqueous precipitating liquid containing the stabilizing agent (C) with simultaneous or subsequent removal of the organic solvent. Another method is dispersion of component (B) from the molten condition into the aqueous phase under the action of high shear forces.

The suspensions may be processed by methods and with equipment which are conventionally used in the case of liquid dissolved preparations of comparable types, for example aqueous polymer dispersions or aqueous or organic solutions. These methods include: brushing, knife-coating, dipping, impregnation, rolling on, spraying, spurting, flooding, pouring, electrodipping, kneading and flame spraying.

Dispersions and suspensions according to the invention generally have viscosities (measured according to DIN 53,211) of from 10 to 150 seconds (DIN cup 4mm nozzle) and are suitable for the production of thermostable coatings on ceramics, glass and metal surfaces, particularly for coating wire, for impregnating nonwoven or woven fabrics of glass, graphite or metal fibers, for the production of laminates or expanded plastics, film, sheeting and for bonding metals and inorganic and organic thermostable materials.

Coatings, impregnations and bonds obtained with the dispersions and suspensions according to the invention are distinguished by good thermostability, stability to change in temperature, adhesion to various substrates, high hardness and, depending on the constitution of the binder, good dielectric properties and moldability.

The invention is illustrated by the following Examples, in which parts and percentages are by weight.

EXAMPLE 1

3 drops of a concentrated aqueous solution of ammonia is added to 30 ml of a 0.03% solution of polyacrylic acid which has a viscosity of 12 centipoises. A highly viscous solution is thus formed which is diluted with 35 ml of water. 35 g of polyesterimide powder (praticle size 63 microns, melt viscosity 6 centipoises at 240°C) is suspended in the solution while stirring. The viscous suspension has an efflux time according to DIN 53,211 of 82 seconds. The suspension is stable at room temperature and may be stored for several months.

Wire can be coated with the suspension as follows; a copper wire having a diameter of 1 mm is degreased at 500°C and drawn by about 3 to 5%. The wire is then dipped in the polyesterimide suspension and drawn through a 1 mm die. The coating composition is then hardened for ten minutes at 250°C. The coating process is repeated as often as is necessary to achieve an increase in diameter of from 50 to 60 microns. This is the case after two or three passes. The coating may also be carried out mechanically, hardening being carried out in a kiln at a temperature of 480°C. Coated wires have torsion values of 120 to 130, heat shock stability of 220° to 230°C, heat pressure values of 330° to 380°C and external fiber elongation values of 65 to 80%.

EXAMPLE 2

A glass cloth is dipped into the solution prepared in Example 1 and hardened at 250°C and these steps are repeated until the polyesterimide content has reached 50% by weight. Polyesterimide prepregs are thus obtained from which laminates may be prepared by laying the prepregs one on another and pressing them at a temperature of 270°C and under a pessure of 200 kg. cm$^{-2}$ for 20 minutes. The laminates of about 4 mm in thickness have a flexural strength of 3660 kp.cm$^{-2}$ and a bending f modules of 180,000 kg.cm$^{2.}$

EXAMPLE 3

30 g of the polyesterimide powder described in Example 1 and 10 g of polyamideimide powder (particle size less than 25 microns; intrinsic viscosity 0.5 (dl/g), measured as a 0.5% solution is N-methylpyrrolidone) are suspended in 60 ml of a polyacrylic acid solution prepared as described in Example 1 and mixed together with a high speed mixer. The suspension is then used as described in Example 1 for coating wire. A heat shock resistance of up to 270°C and a heat pressure value of up to 380°C are obtained.

EXAMPLE 4

5 g of polyvinyl alcohol (visocity of a 2% solution: 50 centipoises) is dissolved in 100 ml of water. The 50 g of polyester based on dimethyl terephthalate, glyccrol and glycol with a mean particle size of 25 microns (K value 65) is suspended therein. The suspension has an efflux time according to DIN 53,211 of 120 seconds. The suspension is stable for several weeks and may be used for the production of coatings for wire, laminate prepregs and film or sheeting.

EXAMPLE 5

The procedure of Example 1 is followed. The polyesterimide powder is further comminuted in a ball mill with the addition of glycol. The particle size is from 0.2 to 2.5 microns, the bulk of the particles being 1.9 microns.

The dispersion obtained is particularly stable in storage. when several layers are applied by a wire coating machine coated wires are obtained with a particularly low incidence of faults. The insulation resistance according to DIN 46,453 is an average of 15% higher than in the case of the coated wires according to Example 1.

EXAMPLE 6

The flow of the coatings according to Example 5 may be further inproved by homogeneously stirring into the suspension 5% by weight, based on the suspended binder, of a mixture of 1 part of phenol and 3 parts of cresol with an impeller.

EXAMPLE 7

A suspension of a finely divided polyesteramide (K value 53, most frequent particle sizes from 0.5 to 3.5 microns, content of N-methylpyrrolidone in the polyesteramide 4.2% by weight) is dispersed analogously to Example 4 with polyvinyl alcohol as the suspension agent.

The binder suspension is sprayed by means of a compressed air spraygun onto bonderized sheet steel. The whole is dried for 10 minutes at 130°C and then for ten minutes at 210°C. An elastic hard coating is obtained which does not lose its properties even upon prolonged thermal stress at temperatures above 100°C up to about 150°C. The parts coated in this way may be used for the external casings of furnaces and electrical heating equipment.

For coating large metal constructional parts the suspension is applied as above with a compressed air spraygun and the coating is then sintered by playing a blowlamp flame on it. Constructional units subjected to thermal stress (reactors, offgas lines, etc.) may be provided in this way with a protective coating which has good resistance to corrosion and is resistant to many solvents.

EXAMPLE 8

3 drops of concentrated aqueous ammonia solution in added to 35ml of a 0.03% polyacrylic acid solution in water and glycerol in the ratio 97.3 which has a viscosity of 13 centipoises. A viscous solution is formed into which 40 g of a coating powder (particle size 0.3 to 25 microns, melt viscosity at 240°C 8 centipoises) is stirred.

The coating powder consists of a slightly branched polyester (prepared from terephthalic acid, isophthalic acid, ethylene glycol, hexanediol, and trthydroxyethyl isocyanurate) and contains nomogeneously dispersed therein 30% by weight of iron oxide pigment and 0.05% by weight of antimony oxide as curing catalyst.

The aqueous suspension obtained has an efflux time according to DIN 53,311 of 80 seconds. It is applied to various metals by pouring, spraying and by roller-coating. Hard elastic hiding coatings are obtained by baking at temperatures of from 220° to 260°C.

EXAMPLE 9

A polybismaleimide based on a bismaleimide prepared from 4,4'-diaminodiphenyl ether and maleic anhydride is ground in an air jet mill in the presence of 2% by weight of ethylene glycol and 2% by of N-methylpyrrolidone until the mean particle size is from 1 to 5 microns.

The powder is stirred by means of an impeller into an aqueous 1% solution of a copolymer of 15% by weight of ammonium acrylate and 85% by weight of N-vinylpyrrolidone.

Glass fiber mats are impregnated with this dispersion and then dried until anhydrous. Thermostable moldings can be prepared from these prepregs by pressure sintering at high pressure and elevated temperature.

EXAMPLE 10

25 parts of a polyester prepared from 28.6 parts of isophthalic acid, 6.3 parts of adipic acid, 5.3 parts of ethylene glycol, 17.6 parts of neopentyl glycol and 0.5 part of trimethylolpropane (50%) dissolved in a mixture of ethyl glycol and xylene is mixed with 7 parts of a hexamethymelamine and then pigmented with 30% be weight, based on the resin component, of titanium dioxide pigment. The coating agent is isolated by vacuum evaporation of the solvent. It is dried and ground to a mean particle size of 2 microns. This powder is dispersed in 60 ml of an aqueous 1% ammonium polyacrylate solution (viscosity 5 centipoises). The suspension is stable and can be kept for several months. Any slight sediment may be readily redispersed.

It is applied by means of a compressed air spraygun to deep drawing sheet steel so that baking there results a layer thickness of 50 microns. At baking temperatures above 170°C coatings are obtained having high hardness (pendulum hardness according to DIN 53,157): 160 seconds), high elasticity (DIN 53,156: 7.6 mm) and good long-term temperature stability (alternation in the elastically when kept for fourteen days at 120°C from 7.6 to 5.0 mm).

We claim:
1. A thermostable coating, impregnating or bonding agent which consists essentially of a dispersion of
   A. water;
   B. a water-insoluble or at most slightly water-swellable thermostable polyesterimide binder; and
   C. a suspension agent dissolved in water, the component (B) having a long-term service termperature of more than 100°C and being present in the form of particles having a particle diameter of from 0.1 to 150 microns and the component (C) consisting essentially of a high molecular weight vinyl pyrrolidone homopolymer or copolymer containing a major amount of vinyl pyrrolidone and having a viscosity of from 0.5 to 50 centipoises in an 0.015% aqueous solution at 20°C, wherein said coating, impregnating or bonding agent includes from 45 to 80% by weight of component (A); from 20 to 55% by weight of component (B); and from 0.01 to 5% by weight of component (C) the sum of the percentages of (A), (B) and (C) being 100.

2. A thermostable coating, impregnating or bonding agent as claimed in claim 1 wherein the particles of component (B) contain at least one member selected from the group consisting of pigment, filler, dye, crosslinking catalyst, accelerator, flow improver and solvent.

3. A thermostable coating, impregnating or bonding agent as claimed in claim 1 wherein the particles of component (B) have particle diameters of from 0.5 to 90 microns.

4. A thermostable coating, impregnating of bonding agent as claimed in claim 1 wherein the content of additives and auxiliaries in the mixture (B) is from 25% to 90% by weight.

* * * * *